United States Patent [19]

Lagrolet et al.

[11] Patent Number: 5,718,156
[45] Date of Patent: Feb. 17, 1998

[54] PROCESS FOR MACHINING TITANIUM PARTS USING SEPARATE BIASED SPRAYING COLLAR

[75] Inventors: Serge Pierre Jean Lagrolet, Fontenay Aux Roses; Jean-Pierre Leboulanger, Chartrettes; Serge André Marcel Vallet, Bretigny Sur Orge, all of France

[73] Assignee: Societe Nationale d'etude et de Construction de Monteurs d'Aviation "Snecma", Paris, France

[21] Appl. No.: 705,689

[22] Filed: Aug. 29, 1996

Related U.S. Application Data

[63] Continuation of Ser. No. 351,133, Nov. 30, 1994, abandoned.

[30] Foreign Application Priority Data

Dec. 1, 1993 [FR] France ................... 93 14364

[51] Int. Cl.$^6$ .................. B23B 1/00; B23B 27/10; B23Q 11/10
[52] U.S. Cl. ........................ 82/1.11; 407/11
[58] Field of Search ................ 407/11; 82/1.11, 82/900; 409/136; 408/58; 184/6.14

[56] References Cited

U.S. PATENT DOCUMENTS

| 4,791,840 | 12/1988 | De Rosier et al. |
|---|---|---|
| 4,848,198 | 7/1989 | Royal et al. ................ 407/11 |
| 5,148,728 | 9/1992 | Mazurkiewicz . |
| 5,340,242 | 8/1994 | Armbrost ................ 407/11 |

FOREIGN PATENT DOCUMENTS

| 0 211 652 | 2/1987 | European Pat. Off. . |
|---|---|---|
| 1115922 | 5/1956 | France ................ 407/11 |
| 1 593 553 | 7/1970 | France . |

*Primary Examiner*—Daniel W. Howell
*Assistant Examiner*—Kenneth J. Hansen
*Attorney, Agent, or Firm*—Oblon, Spivak, McClelland, Maier & Neustadt, P.C.

[57] ABSTRACT

A process for machining titanium or titanium alloy parts with a cutting speed exceeding 150 m/min which uses spraying or sprinkling of lubricating fluid under very high pressures (60 to 400 bars). The main component is a spraying flange or collar having internal ducts making it possible to supply under high pressure one or more fluid jets in the direction of the edge of the cutting tip.

8 Claims, 3 Drawing Sheets

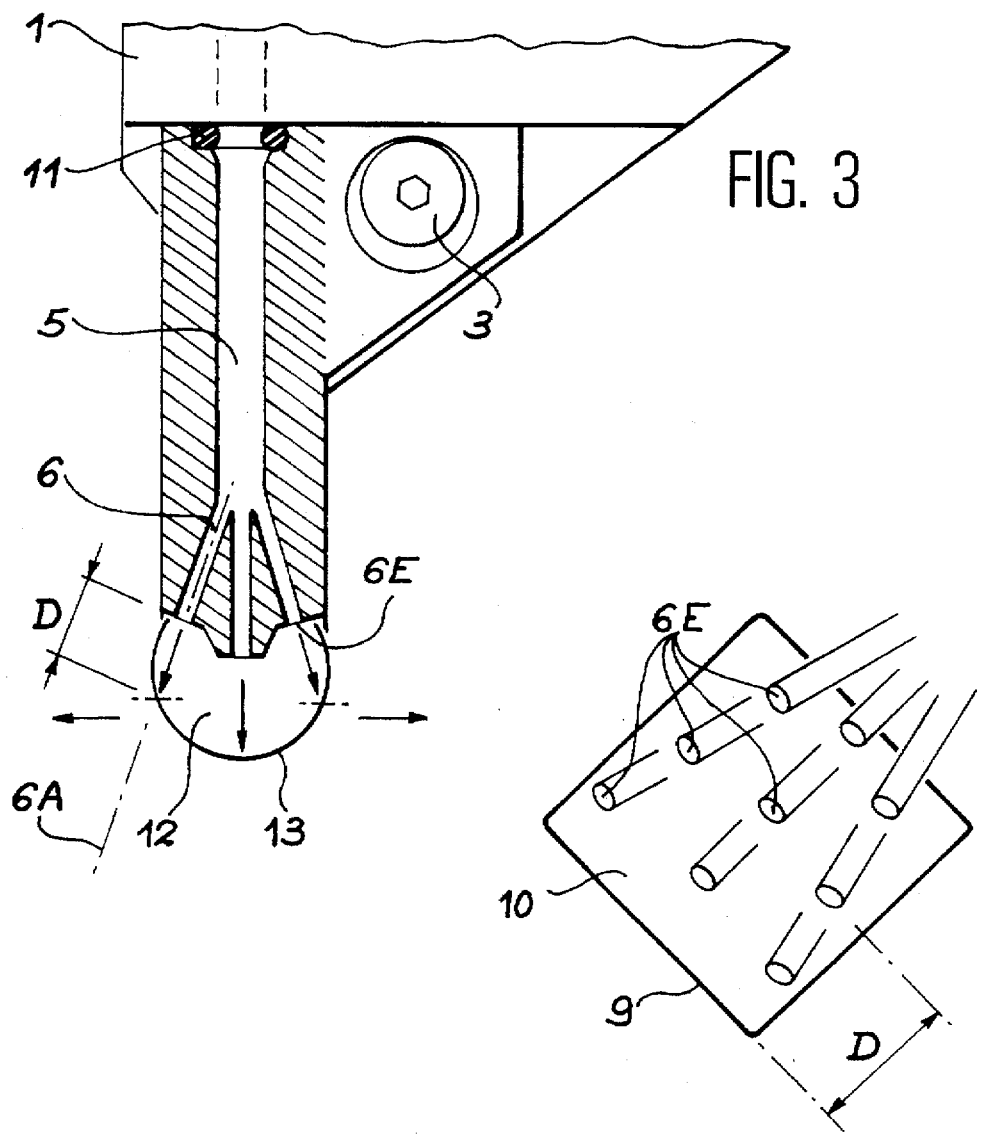
FIG. 3
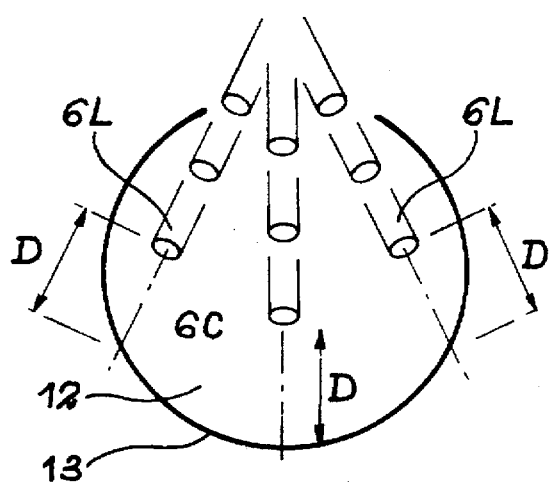
FIG. 4
FIG. 5

PROCESS FOR MACHINING TITANIUM PARTS USING SEPARATE BIASED SPRAYING COLLAR This application is a continuation of application Ser. No. 08/351,133, filed on Nov. 30, 1994, now abandoned.

FIELD OF THE INVENTION

The invention relates to the machining of titanium or titanium alloy parts which in particular must have a high quality surface state.

DESCRIPTION OF THE PRIOR ART

Aircraft and their equipments must be as light as possible so as to facilitate flight maneuverability. This is why titanium, which is a hard, strong metal twice as lighter as steel, is used in large quantities in the construction of parts for forming numerous devices equipping aircraft and this obviously applies to jet engines.

In addition, the weight carried by an aircraft must be at a minimum level, so that the different components must have functional and useful shapes. Therefore numerous parts have precise and sometimes very complex shapes requiring numerous lengthy and complicated machining operations. For example, a rough casting can lose up to 90% of its material in the form of chips, so that the machining required is very important.

SUMMARY OF THE INVENTION

Therefore the main aim of the invention is to machine titanium and titanium alloy parts much faster than hitherto possible. For example, for machining the titanium alloy TA6V, it is known to use cutting speeds up to 60 m/min.

The main objective of the invention is consequently to increase said cutting speed for machining titanium and titanium alloy parts, while maintaining a satisfactory surface state quality.

It is also standard practice to machine steels with cutting speeds of several hundred meters per minute using tungsten carbide tips as tools. In this case, frequently lubrication occurs at high or very high pressures, e.g. 400 bars, in order to facilitate machining. However, these cutting conditions are not conventionally used for the machining of titanium. Thus, the conditions required for machining the latter are very different from those used for steel.

The first main object of the invention is to provide a process for machining titanium or titanium alloy parts by means of tungsten carbide tips.

According to the invention, use is made of at least one high pressure lubricating fluid jet, i.e. at 60 to 400 bars, whose axis is directed above the cutting edge of the machining tip.

In order to facilitate this, the distance D separating the end of the duct of the jet with the cutting edge from the machining tip must be between 4 and 12 mm (4 mm$\leq$D$\leq$12 mm).

In the case of a linear duct of the fluid jet, the only diameter reduction available is through a reduction cone, whose conicity C with respect to the axis of the duct must not exceed 45° (C$\leq$45°).

However, in the case of a linear duct of the fluid jet, said diameter reduction can only be used over a length L between 6 d and 10 d, (6 d$\leq$L$\leq$d), d being the diameter of the reduced duct of the jet.

In the case of a duct of the fluid jet with a change of direction the change of direction angle A must not exceed 30° (A$\leq$30°).

In the case of a diameter reduction of the fluid jet duct, the upstream section, which is the widest, must terminate as a cone, whose conicity F must not exceed 120° (F$\leq$120°).

An inclination angle I can be provided between the axis of the jet and the cutting face and said angle must not exceed 30° (I$\leq$30°).

When use is made of a machining tip having a large cutting edge, several fluid jets can be used for lubricating said edge.

A second main object of the invention is to provide a tool holder spraying flange or collar for machining titanium and titanium alloy parts.

According to the invention, thus comprises means for fixing the collar to the tool holder and at least one duct for the distribution of pressurized jets, whereof a final portion thereof issues along an axis oriented towards the cutting edge of the tool. In the case of a linear cutting edge, several fluid jet ducts can be provided, wherein a central duct is perpendicular to the cutting edge and two lateral ducts are displaced slightly on either side of the central duct.

This same duct distribution can be used in the case of a circular arc cutting edge.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3, illustrates in section and in a plan view, the same collar as FIG. 1 used with a tip, but whose cutting edge is circular.

FIG. 4 is a diagram relative to the positioning of the fluid jets illustrating a machining tip with a linear edge.

FIG. 5 is a diagram relative to the positioning distance of the fluid jets when using a machining tip with a circular cutting edge.

FIG. 1 shows in section a tool holder 1 to which is fixed a flange or collar 2 to be used for lubrication by spraying with a machining tip 10, e.g. of tungsten carbide, fixed to the tool holder 1. The collar is fixed by two fixing screws 3. As illustrated in FIGS. 1 and 2, the screw 3 which is farthest away from tip 10 comprises an eccentric type screw which, upon being tightened, is engageable with a portion of the flange or collar 2 to bias the same towards a duct 4 formed in the tool holder 1. The second screw 3 which is closest to the tip serves to secure the flange or collar to the tool holder 1. It has an internal duct 5 positioned facing the duct 4 of the tool holder 1. A gasket or packing 11 can complete the arrangement at the junction of the two parts.

Figure 1:
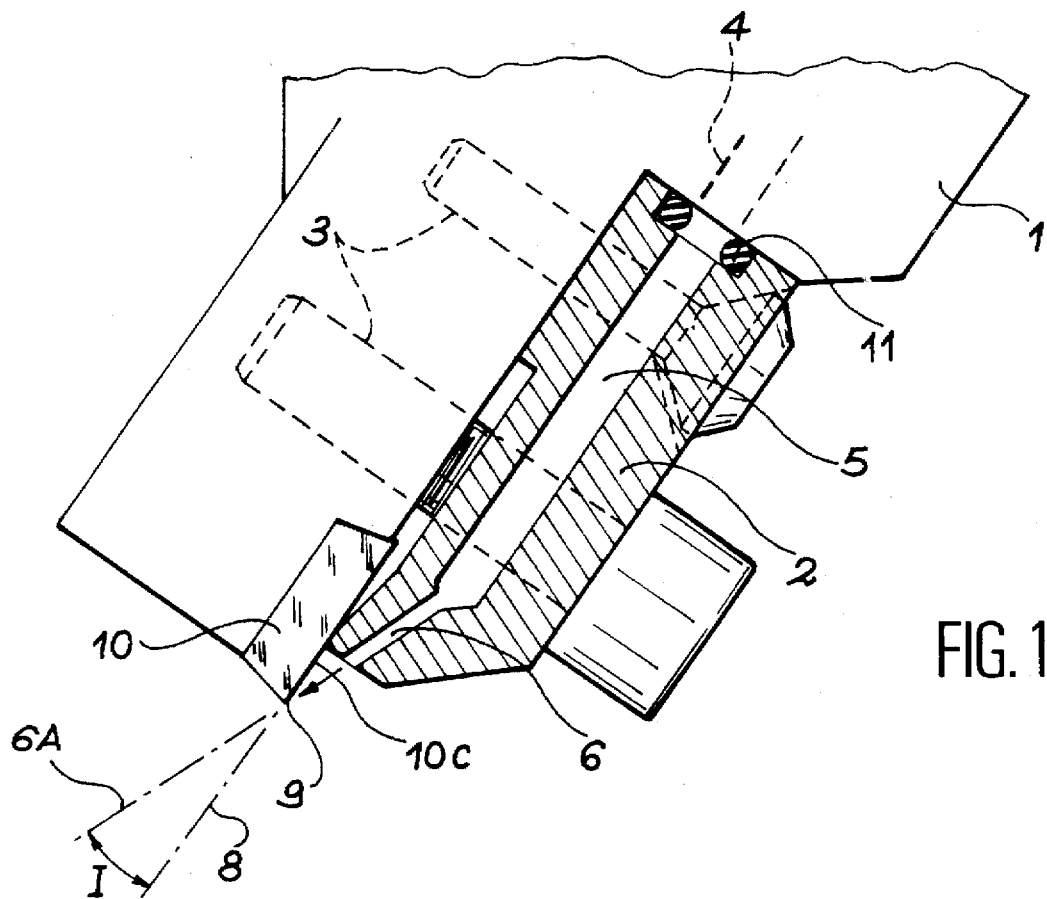
FIG. 1, illustrates in section, a collar according to the invention.

The internal duct 5 is extended by a duct 6 for the fluid jet, which is oriented towards the cutting edge 9 of the machining tip 10. In other words, the axis 6A of the duct 6 is directed towards said cutting edge 9. It is possible to see the inclination angle I determining the positioning of the duct 6 and its axis 6A relative to the orientation of the plane of the cutting face symbolized by an axis 8. Preferably, said orientation angle I is between 0° and 30°.

Thus, it is possible to bring a lubricating fluid under high pressure into the internal duct 5 of the collar 2 and project a lubricant jet by means of the duct 6 onto the cutting edge 9 of the machining tip 10. Lubricating fluid pressures between 80 and at least 400 bars ($80.10^5$ and $400.10^5$ Pascals) can be used for titanium or titanium alloy parts.

The action of the lubricant under high pressures on the chip being produced during cutting has the effect of making the latter slide, prevents the transmission to the cutting edge of the heat accumulated in the chip, but still cools the cutting edge and the chip. The excess power due to the high pressure makes it possible to break up the chip.

It is therefore possible to machine titanium or titanium alloy parts with a cutting speed close to 150 m/min. The surface state obtained is of the same quality as that obtained under conventional machining conditions for said material. Parts are obtained with a precision close to 1 micrometer.

Obviously, under these pressure conditions of the lubricating fluid, it is necessary to provide the machine tool with appropriate fittings. In particular, a tight cover must cover the volume previously accessible to the operator. Thus, pressures of approximately 300 bars ($300.10^5$ Pascals) during the machining operations give rise to permanent projections of lubricating fluid and chips. All the surfaces defining the internal machining volume, i.e. the tool holder, the part, the tool of the internal walls of the machine tool and the cover are subject to permanent projection and spraying effects.

FIG. 1 shows that the spraying collar 2 can not only have a hydraulic function, but can also cooperate in fixing the machining tip 10 to the tool holder 1.

Figure 2:
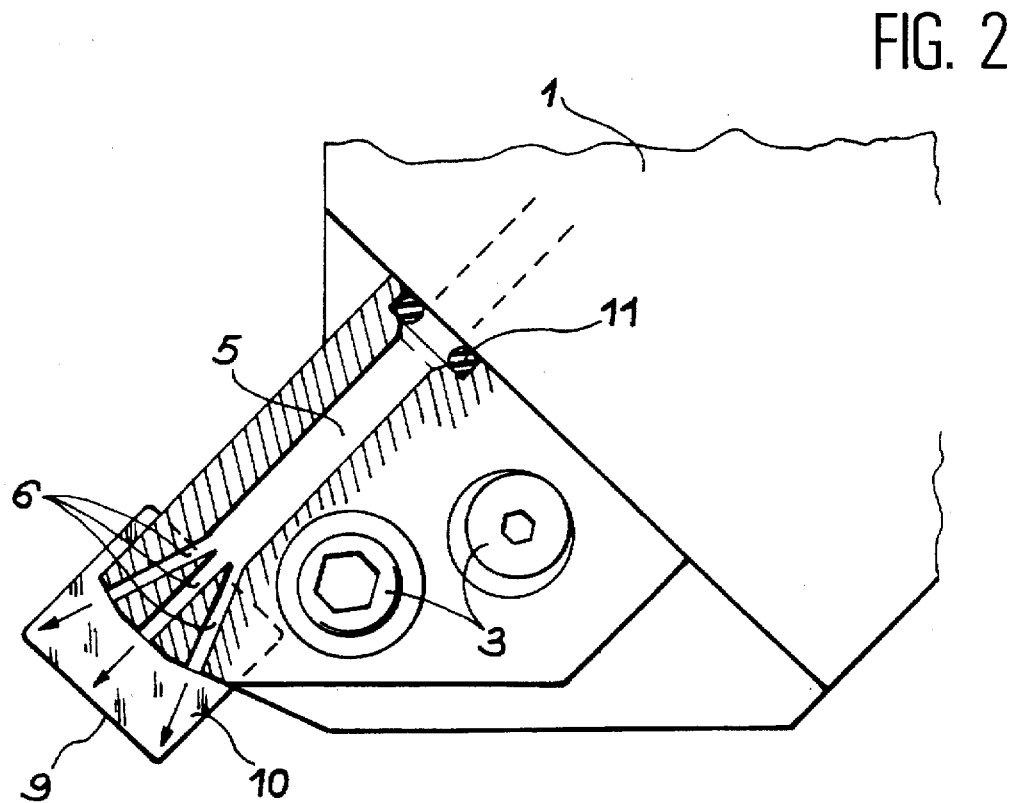
FIG. 2, shows in section and in a plan view, the same collar as in FIG. 1, when using a tip with a linear cutting edge.

FIG. 2 shows an embodiment of such an arrangement as is shown in FIG. 1. In this case, the machining tip 10 is a tungsten carbide tip with a linear cutting edge 9 and can be operational over several millimeters. Thus, it is possible to subdivide the duct 6 into three portions with a view to the distribution of the lubricating fluid over all the active parts of the cutting edge 9.

With reference to FIG. 3, the arrangement is the same as in FIG. 2 but wherein only a single eccentric type screw 3 is utilized. The machining tip 12 has a circular cutting edge 13 with the aim of machining annular grooves or performing traverses by turning. The three ducts 6 are also positioned in an angular manner in the same way as the positioning of the ducts 6 in FIG. 2. They therefore are oriented in a nonparallel manner. However, it can be seen that their end 6E is positioned a relatively constant distance D from the point of the cutting edge 13 located in the extension of their respective axis. In this way the lubricating fluid reaches the cutting edge under the same conditions at each point.

FIG. 4 diagrammatically shows the different possibilities of varying said distance D separating the cutting edge 9 from the ends 6E of the ducts 6. It is appropriate to position said ends 6E at a distance D of between 4 and 12 mm from the cutting edge 9, such that 4 mm$\leq$D$\leq$12 mm. This is also chosen as a function of the angle of inclination I of the axis 6A of said ducts 6 relative to the sectional plane 8 in FIG. 1.

FIG. 5 shows an equivalent diagram applied to a machining tip 12, whose cutting edge 13 is circular. As illustrated in FIG. 3, the ends 6E of the ducts 6 are at an identical distance D in each case. The central duct 6C is further advanced than the lateral ducts 6L, because the point of the cutting edge 13 which it reaches is further removed than the points reached by the fluid jets from the lateral ducts 6L.

Figure 6:
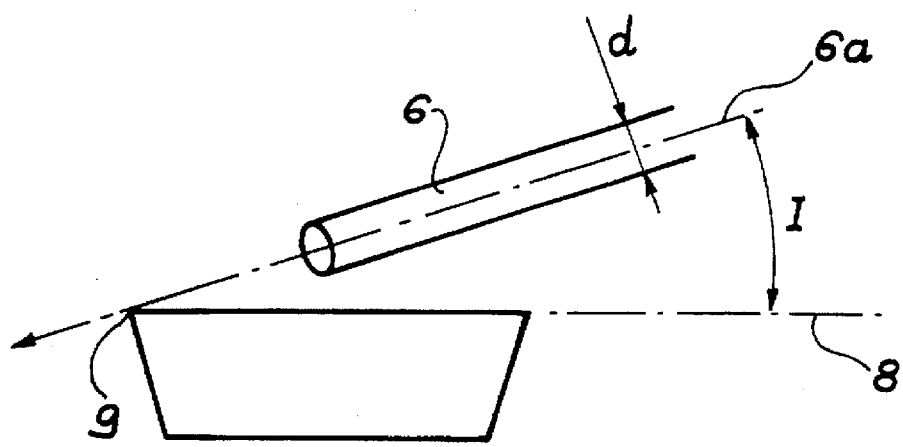
FIG. 6 is an explanatory diagram of the positioning of a fluid jet duct relative to the machining tip.

FIG. 6 not only shows the inclination angle I in FIG. 1 of axis 6a with the cutting plane 8, but also the direction of the inclination. Axis 6a is pointed towards or is directed to a location exactly on the cutting edge 9.

Figure 7:
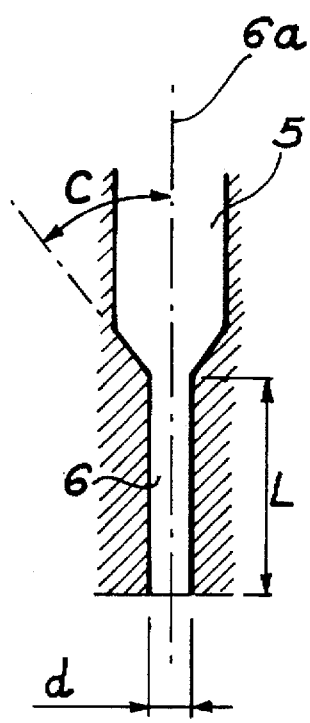
FIG. 7 is an explanatory diagram of the shape of a fluid jet duct with a diameter reduction.

FIG. 7 illustrates the fact that it is possible to obtain a very high pressure on leaving the duct 6 by using, within the collar, a diameter reduction between the internal duct 5 and the duct 6. However, in order not to cause disturbances in the lubricating fluid flow, it is particularly effective to use a conical diameter reduction having a conicity angle C not exceeding 45° with the axis 6a of the duct 6 such that 0°$\leq$C$\leq$45°.

Moreover, the terminal portion of the duct 6 spraying the lubricating fluid jet must not be too long, which would lead to a pressure loss, but must also not be too short, which could lead to a non-homogeneous jet. Preferably, the length L of the duct 6 is between 6×d and 10×d such that 6 d$\leq$L$\leq$10 d.

Figure 8:
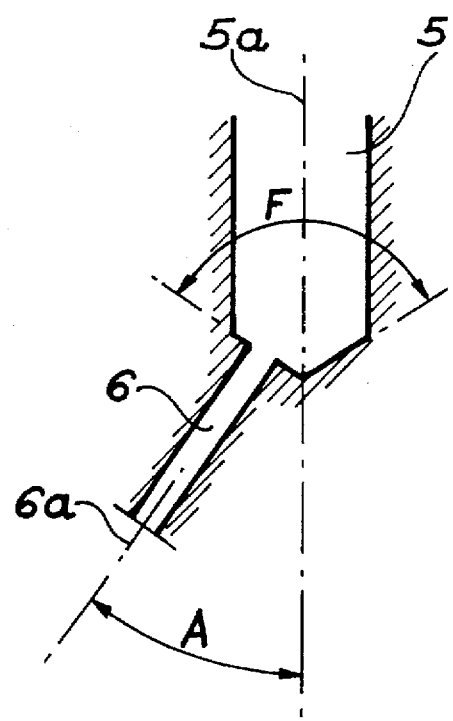
FIG. 8 is an explanatory diagram of a fluid jet duct used for a change in direction of the jet of fluid.

FIG. 8 illustrates a direction change between the internal duct 5 and the duct 6. In order not to cause excessive disturbance in the lubricating fluid, it is preferable for the angle A between the axis 6a of the duct 6 and the axis 5a of the internal duct 5 not to exceed 30° such that 0°$\leq$A$\leq$30°. Moreover, if there is to be a diameter reduction at this level, the hole forming the internal duct 5 must not terminate in a sudden manner. A conical termination by a maximum angle of 120° is preferable in this case such that 0°$\leq$F$\leq$120°.

Bearing in mind the very high pressures of 80 to 400 bars ($80.10^5$ to $400.10^5$ Pascals) used for this type of machining of titanium or titanium alloy parts, special fittings must be provided on the machine tool. For example, it is necessary to provide systems for sucking off the mist resulting from the mixing of chips and lubricating fluid droplets. The latter must be filtered to a degree which is preferably below 50 µm. Such a filtration is obtained by means of a sheet of paper like that used for the tank of a soluble oil grinder.

The high pressure pump used for performing such a process must be able to supply lubricating fluid jets with a total power of approximately 10 kW under a pressure of 300 bars (e.g. pump PT 18 supplied by PMH . . . ). Such a pump is driven by a 15 kW, three-phase motor.

As is illustrated by the last two drawings, it is necessary to respect hydromechanical rules in order to limit pressure losses in the spraying collar, i.e. in the internal ducts 5 and ducts 6. It is therefore necessary to use regular curves for these ducts without having excessively sudden direction changes or excessively sudden cross-sectional changes. It is also necessary to avoid dead recirculation chambers.

Under such machining and lubricating conditions, it is possible to reach cutting speeds of 150 to 180 m/min, which is a gain of 2.5 on the cutting time. There is a 30 to 40% improvement in the overall production time.

In view of the fact that the chips are cut up, their discharge is improved. With regards to the surface states obtained, a large RA of approximately 0.4 can be obtained.

It is preferable not to exceed a value of 300 bars for the pressure used. Beyond this level the chips might be discharged against the faces of the part with a force which might damage the same.

We claim:

1. A process for machining one of a titanium part and a titanium alloy part using a tungsten carbide tip having a cutting edge, which comprises:

securing a collar to a tool holder having a duct formed therein by utilizing at least one eccentric securing member which biases said collar towards said duct and fluid tightly securing the collar to the tool holder with said at least one eccentric securing member;

jetting from the duct a lubricating fluid jet towards a position just above a cutting edge of the tip at a pressure of from 60 to 340 bars and lubricating the edge to allow the edge to slide more easily with respect to the part being cut;

supplying the lubricating fluid jet in a linear manner wherein the duct comprises a first duct and a second duct communicating with the first duct;

inclining a longitudinal axis of the second duct with respect to the plane of a cutting face of the machining tip by an angle of inclination I such that $7° \leq I \leq 30°$; and forming a reduced diameter portion between the first and second ducts, the reduced diameter portion forming a collar in the form of a reduction cone wherein the conicity C of the reduction cone is such that $0° \leq C \leq 45°$ and wherein each of said first and second ducts is formed so as to respectively have a substantially constant diameter.

2. A process for machining one of a titanium part and a titanium alloy part using a tungsten carbide tip having a cutting edge, which comprises:

securing a collar to a tool holder having a duct formed therein by utilizing at least one eccentric securing member which biases said collar towards said duct and fluid tightly securing the collar to the tool holder with said at least one eccentric securing member;

jetting from the duct a lubricating fluid jet towards a position just above a cutting edge of the tip at a pressure of from 60 to 340 bars and lubricating the edge to allow said edge to slide more easily with respect to the part being cut wherein a distance D between the end of the duct and the cutting edge is such that $1.2 \text{ mm} \leq D \leq 4 \text{ mm}$ and wherein the duct includes a first duct and a second duct communicated with the first duct;

inclining the axis of the second duct with respect to the plane of a cutting face of the machining tip by an angle of inclination I such that $7° \leq I \leq 30°$; and jetting a plurality of lubricating fluid jets from said second duct wherein the number of jets used is determined as a function of the length of the cutting edge and the jets are angled with respect to one another so as to be oriented in a nonparallel manner.

3. A machining process according to claim 2, which comprises cutting said one of said titanium part and said titanium alloy part at a cutting speed exceeding 150 m/min.

4. A process as claimed in claim 2, which comprises angling the second duct with respect to the first duct by an angle A such that $0° \leq A \leq 30°$.

5. A machining process according to claim 2, which comprises setting the relationship of a diameter d of said second duct to a length L of said second duct is such that $6d \leq L \leq 10d$ so as to avoid a pressure loss in said second duct of the lubricating fluid jet.

6. The process for machining one of a titanium part and a titanium alloy part having a tungsten carbide tip with a cutting edge, which comprises:

securing a collar to a tool holder having a duct formed therein by utilizing at least one eccentric securing member which biases said collar towards said duct and fluid tightly securing the collar to the tool holder with said at least one eccentric securing member;

jetting from the duct a lubricating fluid jet towards a position just above a cutting edge of the tip at a pressure of from 60 to 340 bars and lubricating the edge to allow the edge to slide more easily with respect to the part being cut wherein the duct comprises a first duct and a second duct in communication with said first duct;

inclining a longitudinal axis of the second duct with respect to the plane of a cutting face the machining tip by an angle of inclination I such that $7° \leq I \leq 30°$; and supplying the lubricating fluid jet to the first and second ducts in a linear manner;

setting the relationship of the diameter d of the second duct with respect to the length L of the second duct such that $6d \leq L \leq 10d$ so as to avoid a pressure loss in said second duct of the lubricating fluid jet.

7. A machining process according to claim 6, which comprises setting the diameter of said first duct so as to be greater than the diameter of the second duct.

8. A machining process according to claim 2, which comprises setting the diameter of said first duct so as to be greater than the diameter of the second duct.

* * * * *

UNITED STATES PATENT AND TRADEMARK OFFICE
CERTIFICATE OF CORRECTION

PATENT NO. : 5,718,156
DATED : February 17, 1998
INVENTOR(S) : Serge Pierre Jean LAGROLET et al.

It is certified that error appears in the above-indentified patent and that said Letters Patent is hereby corrected as shown below:

On the title page, Item [73], the Assignee, should read:

--[73]   Assignee:  Societe Nationale d'etude et de Construction de Moteurs d'Aviation "Snecma", Paris, France--

Signed and Sealed this

Fifth Day of May, 1998

*Attest:*

BRUCE LEHMAN

*Attesting Officer*        *Commissioner of Patents and Trademarks*